United States Patent
Sun et al.

(10) Patent No.: US 9,531,513 B2
(45) Date of Patent: Dec. 27, 2016

(54) INTERFERENCE COORDINATION METHOD, BASE STATION, AND COMMUNICATION SYSTEM

(71) Applicant: HUAWEI TECHNOLOGIES CO., LTD., Shenzhen (CN)

(72) Inventors: Jingyuan Sun, Beijing (CN); Yongxing Zhou, Beijing (CN); Xiaotao Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 14/069,792

(22) Filed: Nov. 1, 2013

(65) Prior Publication Data

US 2014/0056282 A1   Feb. 27, 2014

Related U.S. Application Data

(63) Continuation of application No. PCT/CN2012/086724, filed on Dec. 17, 2012.

(30) Foreign Application Priority Data

Dec. 15, 2011   (CN) .......................... 2011 1 0420807

(51) Int. Cl.
   *H04L 5/22*   (2006.01)
   *H04L 5/00*   (2006.01)
   (Continued)

(52) U.S. Cl.
   CPC ............ *H04L 5/0037* (2013.01); *H04W 24/02* (2013.01); *H04W 52/143* (2013.01); *H04W 52/247* (2013.01); *H04W 72/1226* (2013.01)

(58) Field of Classification Search
   None
   See application file for complete search history.

(56) References Cited

U.S. PATENT DOCUMENTS

2007/0064632 A1*   3/2007   Zheng et al. ................. 370/281
2011/0165846 A1*   7/2011   Zheng et al. .............. 455/67.13
(Continued)

FOREIGN PATENT DOCUMENTS

CN   101958770   1/2001
CN   101373998   2/2009
(Continued)

OTHER PUBLICATIONS

International Search Report mailed Mar. 28, 2013 in corresponding International Application No. PCT/CN2012/086724.
(Continued)

*Primary Examiner* — Kibrom T Hailu
(74) *Attorney, Agent, or Firm* — Staas & Halsey LLP (57) ABSTRACT

Embodiments of the present invention provide an interference coordination method, a base station, and a communication system. The method includes: acquiring first user channel state information on a first time-frequency resource on which interference coordination is to be performed; acquiring second user channel state information on the first time-frequency resource; pairing a first user and a second user according to the first user channel state information and the second user channel state information to obtain transmit power and a precoding matrix that are corresponding to the second user; and transmitting data to the second user on the first time-frequency resource according to the transmit power and the precoding matrix, but not transmitting data to the first user on the first time-frequency resource.

19 Claims, 4 Drawing Sheets

(51) Int. Cl.
*H04W 24/02* (2009.01)
*H04W 72/12* (2009.01)
*H04W 52/14* (2009.01)
*H04W 52/24* (2009.01)

(56) References Cited

U.S. PATENT DOCUMENTS

| | | | | |
|---|---|---|---|---|
| 2011/0319027 | A1* | 12/2011 | Sayana | H04B 7/0632 455/67.11 |
| 2012/0020319 | A1* | 1/2012 | Song et al. | 370/330 |
| 2012/0120884 | A1* | 5/2012 | Yu | H04B 7/0426 370/329 |
| 2013/0100864 | A1* | 4/2013 | Mukherjee et al. | 370/280 |

FOREIGN PATENT DOCUMENTS

| | | |
|---|---|---|
| CN | 102075294 | 5/2011 |
| CN | 102196587 | 9/2011 |
| CN | 102255706 | 11/2011 |

OTHER PUBLICATIONS

PCT International Search Report and Written Opinion of the International Searching Authority, issued Mar. 8, 2013 in corresponding International Patent Application No. PCT/CN2012/086724.

Motorola, "Coordinated Multi-Point Transmission—Coordinated Beamforming/Precoding and Some Performance Results," R1-090325: TSG-RAN WG1 #55bis, Agenda Item: 12.3, Jan. 12-16, 2009, pp. 1-4, 3rd Generation Partnership Project, Ljubljana, Slovenia.

Texas Instruments, "Coordinated Beamforming with DL MU-MIMO," R1-093474: 3GPP TSG RAN WG1 58, Agenda Item: 15.2, Aug. 24-28, 2009, pp. 1-3, 3rd Generation Partnership Project, Shenzhen, China.

Lv, Xiangyou, Li Wang, Zhimin Zeng, and Tiankui Zhang, "Uplink Multi-user MIMO Interference Cancellation Algorithm for LTE-A Systems," *International Conference on Information, Networking and Automation (ICINA)*, Oct. 18-19, 2010, pp. V1-294-V1-297, vol. 1, Kunming, China.

Extended European Search Report issued Feb. 21, 2014, in corresponding European Patent Application No. 12857912.5.

* cited by examiner

INTERFERENCE COORDINATION METHOD, BASE STATION, AND COMMUNICATION SYSTEM

CROSS-REFERENCE TO RELATED APPLICATIONS

This application is a continuation of International Application No. PCT/CN2012/086724, filed on Dec. 17, 2012, which claims priority to Chinese Patent Application No. 201110420807.7, filed on Dec. 15, 2011, both of which are hereby incorporated by reference in their entireties.

TECHNICAL FIELD

Embodiments of the present invention relate to the field of communications technologies, and in particular, to an interference coordination method, a base station, and a communication system.

BACKGROUND

In a network topology structure of a heterogeneous network, the entire network is covered by multiple macro node devices, and multiple micro nodes are distributed under one macro node device, so that the same time-frequency resource can be reused in the coverage of all nodes, thereby providing gains brought by cell splitting and resource reuse. However, interference between nodes may bring strong interference to a user terminal, and particularly, transmit power of a macro node device is relatively large, which may cause strong interference to a micro node user, that is, one macro node device may simultaneously interfere with data channels of users corresponding to multiple micro nodes.

SUMMARY

Embodiments of the present invention provide an interference coordination method, a base station, and a communication system, so that interference caused by a base station or a base station group to a user served by another base station can be reduced.

To achieve the foregoing objective, the embodiments of the present invention adopt the following technical solutions:

acquiring first user channel state information on a first time-frequency resource on which interference coordination is to be performed;

acquiring second user channel state information on the first time-frequency resource;

pairing a first user and a second user according to the first user channel state information and the second user channel state information to obtain transmit power and a precoding matrix that are corresponding to the second user; and transmitting data to the second user on the first time-frequency resource according to the transmit power and the precoding matrix, but not transmitting data to the first user on the first time-frequency resource.

In one aspect, a base station is provided and includes:

a receiver, configured to acquire first user channel state information on a first time-frequency resource on which interference coordination is to be performed, and acquire second user channel state information on the first time-frequency resource;

a processor, configured to pair a first user and a second user according to the first user channel state information and the second user channel state information to obtain transmit power and a precoding matrix that are corresponding to the second user; and a sender, configured to transmit data to the second user on the first time-frequency resource according to the transmit power and the precoding matrix, but configured not to transmit data to the first user on the first time-frequency resource.

In one aspect, a communication system is provided and includes:

a base station, configured to acquire first user channel state information on a first time-frequency resource on which interference coordination is to be performed and second user channel state information on the first time-frequency resource, transmit data to a second user on the first time-frequency resource according to transmit power and a precoding matrix that are corresponding to the second user and are obtained by a management device; but configured not to transmit data to a first user on the first time-frequency resource; and the management device, configured to pair the first user and the second user according to the first user channel state information and the second user channel state information to obtain the transmit power and the precoding matrix that are corresponding to the second user.

With the interference coordination method, the base station, and the communication system provided in the embodiments of the present invention, first user channel state information on a first time-frequency resource on which interference coordination is to be performed and second user channel state information on the first time-frequency resource are acquired; a first user and a second user are paired according to the first user channel state information and the second user channel state information to obtain transmit power and a precoding matrix that are corresponding to the second user; and data is transmitted to the second user on the first time-frequency resource according to the transmit power and the precoding matrix that are corresponding to the second user, but data is not transmitted to the first user on the first time-frequency resource. Therefore, interference with the first user can be reduced.

BRIEF DESCRIPTION OF DRAWINGS

To describe the technical solutions in the embodiments of the present invention more clearly, the accompanying drawings required for describing the embodiments or the prior art are introduced briefly in the following. Apparently, the accompanying drawings in the following description only show some embodiments of the present invention, and persons of ordinary skill in the art can still obtain other drawings according to these accompanying drawings without creative efforts.

DESCRIPTION OF EMBODIMENTS

The technical solutions in the embodiments of the present invention are clearly described in the following with reference to the accompanying drawings in the embodiments of the present invention. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
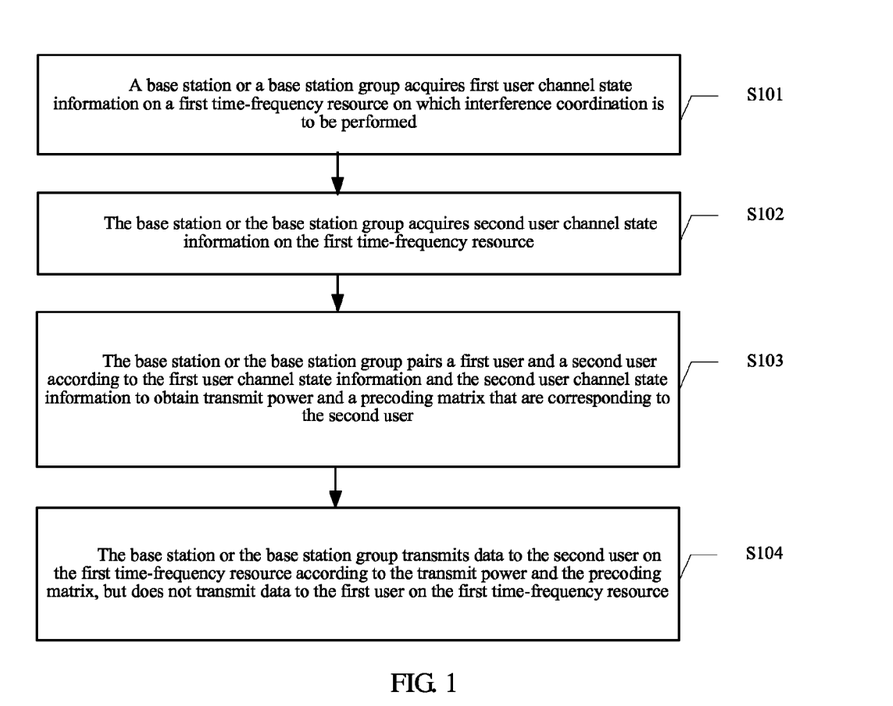
FIG. 1 is a first schematic flow chart of an interference coordination method according to an embodiment of the present invention.

An interference coordination method provided in an embodiment of the present invention may also be called an interference coordination method with partial spatial multiplexing, and as shown in FIG. 1, includes:

S101: A base station or a base station group acquires first user channel state information on a first time-frequency resource on which interference coordination is to be performed.

Herein, a first user may be a user terminal or a virtual user or a base station or a node.

Exemplarily, the first time-frequency resource is a first time-frequency resource on which a base station or a base station group performs interference coordination on the first user; and the first time-frequency resource may be a first time-frequency resource which is predefined and is corresponding to the first user and on which interference coordination is to be performed, may also be a first time-frequency resource which is obtained after negotiation with each base station and is corresponding to the first user and on which interference coordination is to be performed, and may also be a first time-frequency resource which is obtained through dynamic determination of a processor of the base station or base station group and is corresponding to the first user and on which interference coordination is to be performed.

Meanwhile, the first time-frequency resource which is obtained after negotiation with each base station and is corresponding to the first user and on which interference coordination is to be performed may be a first time-frequency resource which is obtained after negotiation, in a notification or request manner, between the base station or base station group and another base station or base station group and on which interference coordination is to be performed. That a user terminal served by a micro node is strongly interfered by a macro node is taken as an example for description, and in this case, the user terminal served by the micro node is a first user. First, after determining a proportion of user terminals that are strongly interfered by the corresponding macro node, the micro node sends, to the macro node, a request for performing interference coordination on resources of a corresponding proportion. Next, the macro node determines, according to request information from multiple nodes, the resources on which interference coordination is to be performed and interference coordination is to be performed on which nodes on which resources. Then, the macro node acquires the first time-frequency resource which is corresponding to the first user and on which interference coordination is to be performed.

The first time-frequency resource in this embodiment may be a predefined first time-frequency resource, or may be determined after negotiation between base stations. The first time-frequency resource in this embodiment may be determined statically or determined half-statically, and may also be determined dynamically.

A quantity of the first user may be one or multiple. Different time-frequency resources may be corresponding to different quantities of the first user and different types of the first user, and the base station or base station group performs interference coordination on a corresponding time-frequency resource for a corresponding first user.

The first user channel state information on the first time-frequency resource on which interference coordination acquired by the base station or the base station group may be: obtained after the first user measures and generates the first user channel state information and feeds back the first user channel state information to the base station or the base station group, after the base station or the base station group sends a channel state request message to the first user; or, obtained after the first user measures and generates the first user channel state information and feeds back the first user channel state information to another base station and then the another base station forwards the first user channel state information to the base station or the base station group which performs interference coordination, after the base station or the base station group sends a channel state request message to the another base station; or obtained after the base station or the base station group measures uplink channel information of the first user and adjusts the uplink channel information.

The first user channel state information is channel state information between the base station and the first user, or is first user channel state information between the base station group and the first user. The first user channel state information may include a channel matrix formed by a channel coefficient of a corresponding channel or a character vector of a corresponding channel; and the first user channel state information may further include channel quality information such as a signal to interference plus noise ratio of the channel. The first user channel state information is first user channel state information corresponding to the first time-frequency resource; or, the first user channel state information is first user channel state information which is corresponding to the first time-frequency resource and on which statistics is made in a time domain, a frequency domain, or a time-frequency domain.

S102: The base station or the base station group acquires second user channel state information on the first time-frequency resource.

S103: The base station or the base station group pairs the first user and a second user according to the first user channel state information and the second user channel state information to obtain transmit power and a precoding matrix that are corresponding to the second user.

Herein, the second user may be a user terminal served by the base station or a user terminal served by the base station group, a quantity of the first user is one or multiple, and a quantity of the second user is one or multiple. Different time-frequency resources may be corresponding to the same quantity or different quantities of the first user and the same type or different types of the first user, and may be corresponding to the same quantity or different quantities of the second user and the same type or different types of the second user.

An example of a scheduling and pairing process is described in the following, to which the scheduling and pairing process is not limited.

One or more corresponding first users serve as pre-scheduled users. Transmit power of a pre-scheduled user may be set to a random value, and transmit power of the base station or the base station group on a corresponding radio resource is not occupied.

On the basis of pre-scheduling, another user which is further scheduled in an MU-MIMO (Multiple-User Multiple Input Multiple Output, multiple-user multiple input multiple output) manner and is served by the base station or the base station group is referred to as a second user herein. A method such as ZF (Zero Forcing, zero forcing)/BD (Block Diagonalization, block diagonalization)/maximum SLNR (Signal to Leakage and Noise Ratio, signal to leakage and noise ratio) is used to pair the first user and the second user that is to be scheduled. If a PF (Proportional Fairness, proportional fairness) algorithm is used, when a new user is to be added into the pairing and a sum of PF priorities after the pairing is greater than that before the pairing, it is considered that the pairing can be performed. In this case, a second user with a maximum PF priority after the pairing may be selected from all second users that can be paired, and added into a paired combination as a pairing result, and then a new user can be further paired based on the pairing result, till no user can be added for pairing. Power of the second user during the pairing may be set in a manner that, the transmit power of the base station or the base station group on the corresponding radio resource is completely or partially allocated to all the second users, for example, equally allocated to all the second users. Specifically allocated power is not limited herein, as long as transmit power allocated by the base station or the base station group to a second user is within a range of available maximum transmit power of the base station or the base station group on a corresponding time-frequency resource.

S104: The base station or the base station group transmits data to the second user on the first time-frequency resource according to the transmit power and the precoding matrix, but does not transmit data to the first user on the first time-frequency resource.

A subject of the embodiment of the present invention may be a base station or a base station group, and may also be a node or a node group, or a cell or a cell group. When the subject of the embodiment is a base station, adopted scheduling may be MU-MIMO scheduling for a single cell or a single base station; and when the subject of the embodiment of the present invention is a base station group, the adopted scheduling may be JP-MU-MIMO scheduling for multiple cells or multiple base stations. No matter what subject of interference coordination is, the method in the present invention can be used to perform interference coordination on the first user, which is not limited herein.

With the interference coordination method provided in the embodiment of the present invention, a base station or a base station group acquires first user channel state information on a first time-frequency resource on which interference coordination is to be performed and second user channel state information on the first time-frequency resource; pairs a first user and a second user according to the first user channel state information and the second user channel state information to obtain transmit power and a precoding matrix that are corresponding to the second user; and transmits data to the second user on the first time-frequency resource according to the transmit power and the precoding matrix that are corresponding to the second user, but does not transmit data to the first user on the first time-frequency resource. Therefore, interference with the first user can be reduced.

Figure 2:
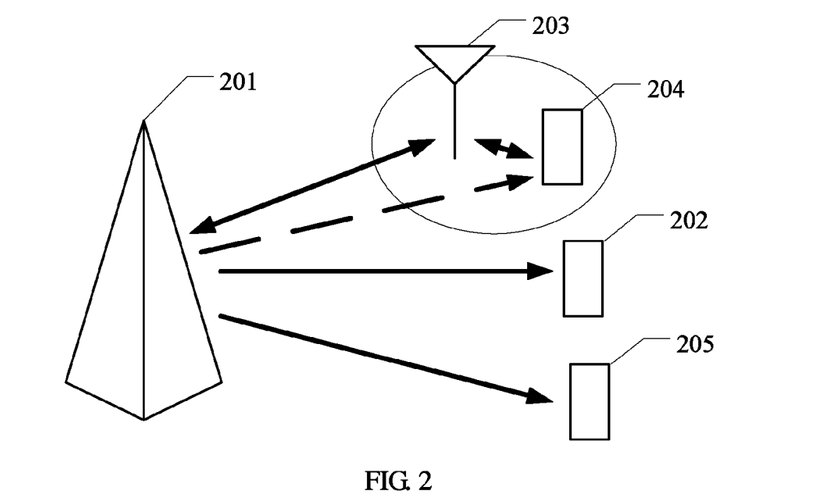
FIG. 2 is a schematic diagram of an application scenario of an interference coordination method according to an embodiment of the present invention.

Another embodiment of the present invention provides an interference coordination method, and by taking a scenario shown in FIG. 2 as an example, it is assumed that a system in this embodiment includes a first base station 201, user terminals 202 and 205 served by the first base station 201, a second base station 203, and a user terminal 204 served by the second base station 203, that the second base station 203 serves as an interfered first user and a zero forcing algorithm is adopted is taken as an example for description.

Figure 3:
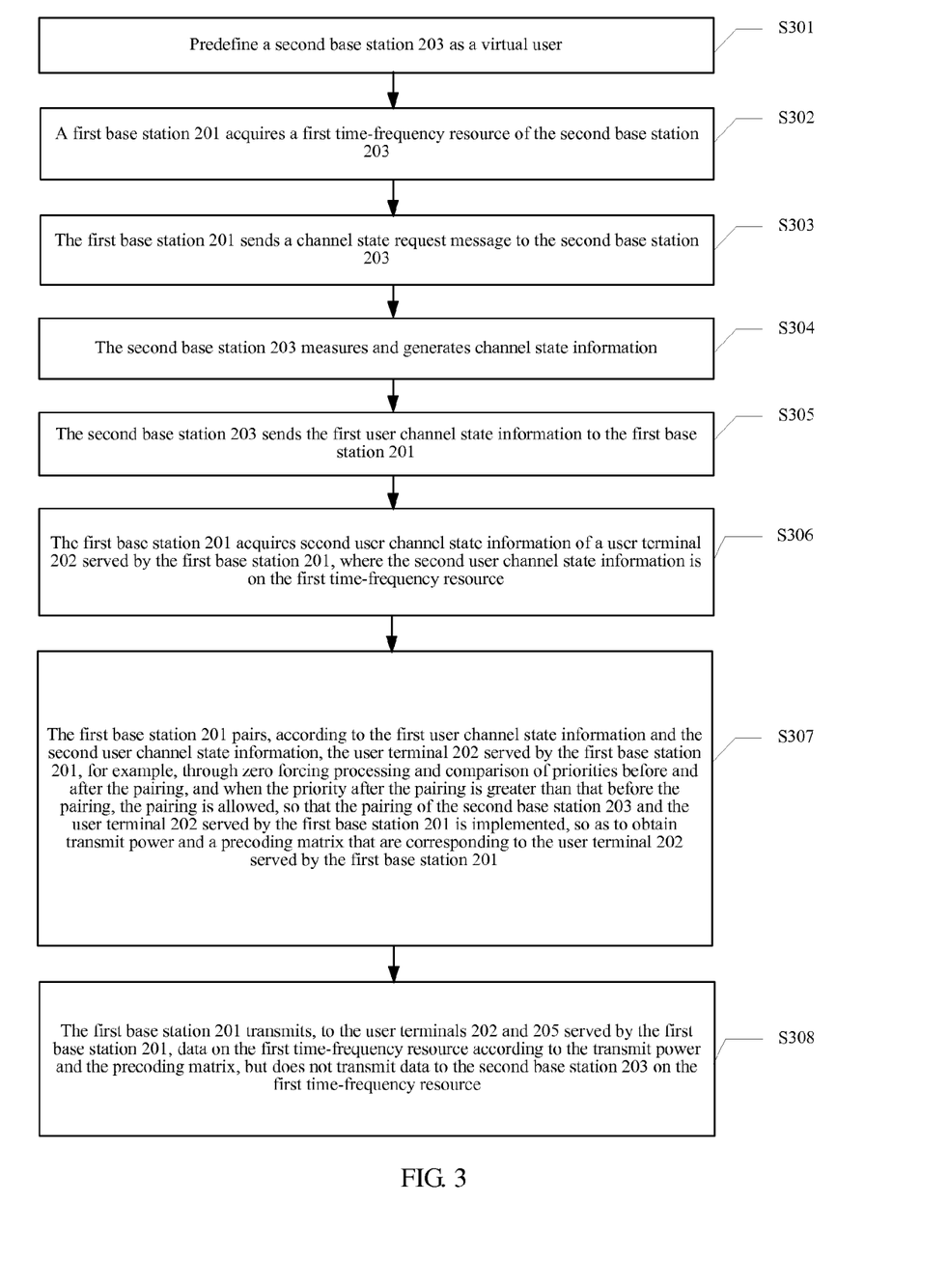
FIG. 3 is a second schematic flow chart of an interference coordination method according to an embodiment of the present invention.

As shown in FIG. 3, the method includes the following steps:

S301: Predefine the second base station 203 as a first user.

It should be noted that, a defining process in this step may be implemented through negotiation between the first base station 201 and the second base station 203, and the first base station 201 is instructed to define the second base station 203 as a first user.

S302: The first base station 201 acquires a first time-frequency resource of the second base station 203.

Exemplarily, the first time-frequency resource of the second base station 203 acquired by the first base station 201 may be a predefined first time-frequency resource on which interference coordination is to be performed on the second base station 203, may also be a first time-frequency resource which is obtained after negotiation between the first base station 201 and each base station and on which interference coordination is to be performed on the second base station 203, and may also be a first time-frequency resource which is obtained through dynamic determination of a processor of the first base station 201 and on which interference coordination is to be performed on the second base station 203. The first time-frequency resource which is obtained after negotiation between the first base station 201 and each base station and on which interference coordination is to be performed on the first user may be a first time-frequency resource which is determined, in a notification or request manner, between the first base station 201 and another base station or base station group and on which interference coordination is to be performed on the second base station 203.

It should be noted that, information transmitted between the base stations includes: information that interference coordination is to be performed on which channels on which resources, where the information is obtained through negotiation, and may be a request or a notification, which includes a request for measuring corresponding channel information and for a resource on which interference coordination is to be performed, or a notification of a resource on which interference coordination is to be performed.

S303: The first base station 201 sends a channel state request message to the second base station 203.

The first base station 201 sends channel state request information to the second base station 203, or sends channel state request information to the user terminal 204 served by the second base station 203, or does not send any channel state request information but the first base station 201 directly measures channel state information of the second base station 203. It may also be that the second base station 203 directly feeds back channel state information, or another base station directly forwards channel state information corresponding to the second base station 203.

S304: The second base station 203 measures and generates first user channel state information.

The first user channel state information is channel state information between the second base station 203 and the first base station 201, and the first user channel state information may include a channel matrix formed by a channel coefficient of a corresponding channel or a character vector of a corresponding channel; and the first user channel state information may further include channel quality information such as a signal to interference plus noise ratio of the channel.

S305: The second base station 203 sends the first user channel state information to the first base station 201.

It is only exemplarily described herein that the first base station 201 acquires, by sending a signal state request message to the second base station 203, the first user channel state information on the first time-frequency resource on which interference coordination is to be performed; and definitely, the first base station 201 may measure uplink channel information of the second base station 203, and obtain downlink channel state information of the second base station 203 according to the uplink channel information.

The sent first user channel state information is first user channel state information between the second base station and the first base station.

Meanwhile, the first user channel state information may be first user channel state information corresponding to the first time-frequency resource between the second base station and the first base station, and may also be first user channel state information which is between the second base station and the first base station and on which statistics is made in a time domain, a frequency domain, or a time-frequency domain.

Definitely, no matter which type of user the first user is, for example, a virtual user, a node, or a user served by a base station or a node, the channel state information is the first user channel state information between the first user and the first base station. Meanwhile, the first user channel state information may be first user channel state information corresponding to the first time-frequency resource between the first user and the first base station, and may also be first user channel state information which is between the first user and the first base station and on which statistics is made in a time domain, a frequency domain, or a time-frequency domain.

It should be added that, when a quantity of the first user is one or multiple, a quantity of a channel between the base station or the base station group and the first user may be one or multiple. It is required to satisfy a condition during scheduling that, no interference or no severe interference is caused to these channels when an actually scheduled user is served. The first user herein may also be a node or a base station, or a user served by a node or a user served by a base station. A channel of the first user is a channel on which the base station or the base station group performs interference coordination, where the channel is from a corresponding cell or node to the first user. In addition, may also be predefined channel information, such as a channel corresponding to a certain subspace or transmission direction or precoding matrix, and in this case, the first user is a virtual user. Moreover, there may be multiple methods for acquiring the first user channel state information, which may be that: the base station or the base station group in this embodiment measures a reference signal of a corresponding first user such as a certain node or a certain user, to obtain the first user channel state information; may also be that: a corresponding first user such as a certain node or a certain user measures a reference signal of the base station or the base station group applying this method, to obtain channel information, and sends the channel information to the base station or a certain or several base stations in the base station group; and may also be that: a user served by a corresponding node measures a reference signal of the base station or the base station group to obtain channel information and feeds back the channel information to the corresponding node, and the corresponding node forwards the channel information to the base station or a certain or several base stations in the base station group.

In this embodiment, that interference coordination is to be performed on the second base station is taken as an example for description, and in the embodiment of the present invention, interference coordination may also be performed on a certain or several users served by the second base station. In this case, it may be defined that information transmitted between the base station and a user terminal served by the base station includes: information that interference coordination is to be performed on which channels on which resources; information that the user terminal is notified to measure and feed back which channel state information, for example, to measure and feed back channel information corresponding to which cell; and information that in a half-static mode, the user terminal may further be notified to measure and feed back channel state information corresponding to serving cells on a resource on which interference coordination is to be performed and on a resource on which interference coordination is not performed.

S306: Acquire second user channel state information of the user terminal 202 served by the first base station 201, where the second user channel state information is on the first time-frequency resource.

S307: The first base station 201 pairs, according to the first user channel state information and the second user channel state information, the user terminal 202 served by the first base station 201, for example, through zero forcing processing and comparison of priorities before and after the pairing, and when the priority after the pairing is greater than that before the pairing, the pairing is allowed, so that the pairing of the second base station 203 and the user terminal 202 served by the first base station 201 may be implemented, so as to obtain transmit power and a precoding matrix that are corresponding to the user terminal 202 served by the first base station 201.

A zero forcing processing method adopted by the first base station 201 may specifically be:

setting that a channel from the user terminal 202 served by the first base station 201 to the first base station 201 is H1, and a channel from the user terminal 205 served by the first base station 201 to the first base station 201 is H2;

setting that a channel from the second base station 203 to the first base station 201 is Hp; and performing zero forcing processing: $ZF[H1, Hp]=[V1, Vp]$, where after the zero forcing processing, when the first base station 201 uses V1 to serve the user terminal 202, interference with the second base station 203 is effectively reduced, that is, $HpV1\approx 0$.

On the basis that the second base station is paired with the user terminal 202 served by the first base station 201, the user terminal 205 served by the first base station 201 may be paired by using the same manner, and if it is allowed to add the user terminal 205 served by the first base station 201 into the pairing, transmit power and a precoding matrix that are corresponding to the user terminal 205 served by the first base station 201 is also generated. $ZF[H1, H2, Hp]=[V1', V2, Vp]$, $HpV1'\approx 0$ and $HpV2\approx 0$.

A sum of priorities of users that may be actually served by the first base station is calculated according to transmit power and precoding matrixes before and after the pairing, and when the priority after the pairing is greater than that before the pairing, the pairing is allowed. The pairing attempt may be performed, based on pre-scheduling, on all users allowed to be paired, and a user that is most suitable for pairing is selected and added into a scheduling result; and then a new user is to be paired on the basis of the existing scheduling result, till no user can be added for pairing, to which an actually used scheduling and pairing algorithm is not limited.

S308: The first base station 201 transmits, to the user terminals 202 and 205 served by the first base station 201, data on the first time-frequency resource according to the transmit power and the precoding matrix, but does not transmit data to the second base station 203 on the first time-frequency resource.

Herein, the first base station 201 only transmits, to the user terminals 202 and 205 served by the first base station 201, data according to the transmit power and the precoding matrix, but does not transmit data to the second base station 203. The transmit power is a part or all of available maximum transmit power of the first base station on the first time-frequency resource, that is, the second base station 203 does not occupy the transmit power of the first base station 201, and all available power may be allocated to the user terminals 202 and 205 served by the first base station 201 to perform scheduling and data transmission processing. In a pairing process of the processor, channel power information of the second base station 203 may be set to any value, for example, it is set that power of a channel whose rank=N and which is corresponding to the second base station 203 is the same as power of a channel whose rank=N and which is corresponding to an actually served user. In the same way, based on the scheduling result, data is transmitted, according to the transmit power and the precoding matrix, to the user terminals 202 and 205 served by the first base station 201, and no data transmission processing is to be performed on the second base station 203.

It should be noted that, step S307 only exemplarily describes the zero forcing processing method adopted by the first base station 201; and in the same way, the first base station 201 may also adopt a maximum signal to leakage and noise ratio SLNR processing method, to acquire, by calculating a maximum or large SLNR, a precoding matrix corresponding to the first base station 201, and the first base station 201 may further acquire, by using a block diagonalization processing method, a precoding matrix corresponding to the first base station 201, to reduce interference caused by the precoding matrix of the first base station 201 in a direction of the second base station 203. Or, a power reduction processing method is adopted to reduce interference caused by the first base station 201 to the second base station 203. Moreover, scheduling performed by the first base station 201 allows simultaneously serving multiple users on the same resource block. The first user is used as a pre-scheduling result on a corresponding resource, and at the same time when another user served by the base station is to be scheduled, processing methods such as zero forcing processing, block diagonalization processing, and maximum signal to leakage ratio processing are adopted to ensure that the base station may not cause interference or may cause less interference to the first user when actually serving a user.

The foregoing embodiment only exemplarily describes a situation that the first user is the second base station 203, and if the second base station 203 serves as the first user, interference with all users of the second base station 203 may be reduced after processing. In the same way, the first user may also be a certain or multiple user terminals or base stations or nodes or virtual users that are corresponding to a subspace; the definition may be set according to a specific environment and its processing method is the same as that in this embodiment.

Herein, whether the second base station 203 or the user terminal 204 served by the second base station is defined as the first user mainly depends on an interfering object of the first base station 201. If the interfering object of the first base station 201 is one or several users of the second base station 203, the one or several user terminals served by the second base station 203 may be used as the first user; if the interfering object of the first base station 201 is all users of the second base station 203, the second base station 203 may be used as the first user; and when the first user serves the user terminal 204, a first channel state request message may be sent, through the first base station 201, to another base station, for example, the second base station 203, and the first base station 201 receives first channel state information which is measured and generated by the first user and forwarded by the another base station.

A subject of the embodiment of the present invention may be a base station or a base station group, and may also be a node or a node group, or a cell or a cell group. When the subject of the embodiment of the present invention is a base station, adopted scheduling may be MU-MIMO scheduling for a single cell or a single base station; and when the subject of the embodiment of the present invention is a base station group, the adopted scheduling may be JP-MU-MIMO scheduling for multiple cells or multiple base stations. No matter what subject of interference coordination is, the method in the present invention can be used to perform interference coordination on the first user, which is not limited herein.

With the interference coordination method provided in the embodiment of the present invention, after sending a channel state request message to a predefined first user, namely, a second base station, a first base station acquires a first time-frequency resource of the second base station, first user channel state information on the first time-frequency resource, and second user channel state information of a user terminal served by the first base station; schedules and pairs, according to the first user channel state information and the second user channel state information, the user terminal served by the first base station, that is, performs zero forcing processing on a channel of the second base station and a channel of the user terminal served by the first base station, so as to obtain transmit power and a precoding matrix that are corresponding to the user terminal served by the first base station; and transmits, to the user terminal served by the first base station, data on the first time-frequency resource according to the transmit power and the precoding matrix, but does not transmit data to the second base station. Therefore, interference with the second base station which serves as the first user can be reduced.

Figure 4:
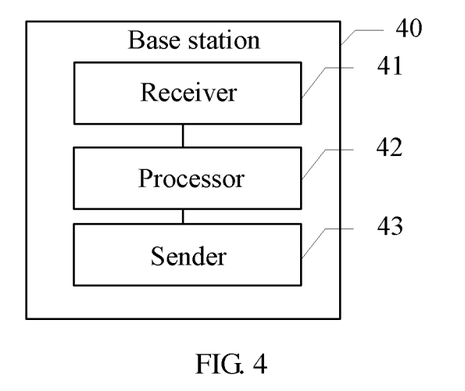
FIG. 4 is a first schematic structural diagram of a base station according to an embodiment of the present invention.

An embodiment of the present invention provides a base station 40, which, as shown in FIG. 4, includes:

a receiver 41, configured to acquire first user channel state information on a first time-frequency resource on which interference coordination is to be performed, and acquire second user channel state information on the first time-frequency resource;

a processor 42, configured to pair a first user and a second user according to the first user channel state information and the second user channel state information to obtain transmit power and a precoding matrix that are corresponding to the second user; and a sender 43, configured to transmit data to the second user on the first time-frequency resource according to the transmit power and the precoding matrix, but configured not to transmit data to the first user on the first time-frequency resource.

The base station provided in the embodiment of the present invention can acquire first user channel state information on a first time-frequency resource on which interference coordination is to be performed and second user channel state information on the first time-frequency resource; pair a first user and a second user according to the first user channel state information and the second user channel state information to obtain transmit power and a precoding matrix that are corresponding to the second user; and transmit data to the second user on the first time-frequency resource according to the transmit power and the precoding matrix, but not transmit data to the first user on the first time-frequency resource. Therefore, interference with the first user can be reduced.

Figure 5:
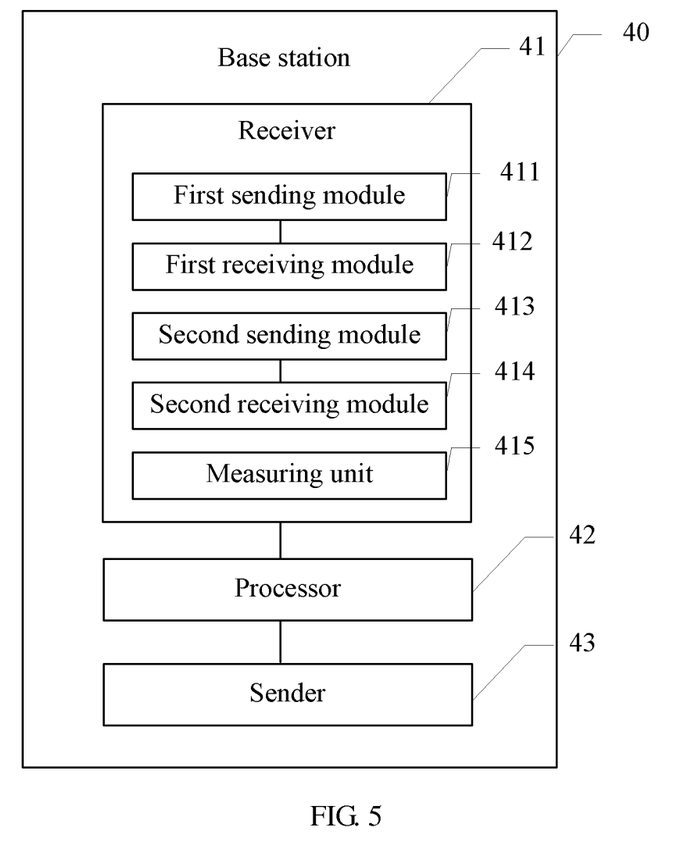
FIG. 5 is a second schematic structural diagram of a base station according to an embodiment of the present invention.

Further, referring to FIG. 5, the receiver 41 further includes:

a first sending module 411, configured to send a channel state request message to the first user;

a first receiving module 412, configured to receive first user channel state information which is measured and generated by the first user, is fed back by the first user, and is on the first time-frequency resource on which interference coordination is to be performed;

and/or, a second sending module 413, configured to send a channel state request message to another base station;

a second receiving module 414, configured to receive first user channel state information which is measured and generated by the first user, is forwarded by the another base station, and is on the first time-frequency resource on which interference coordination is to be performed;

and/or, a measuring unit 415, configured to measure uplink channel information of the first user, and obtain downlink channel state information of the first user according to the uplink channel information.

Figure 6:
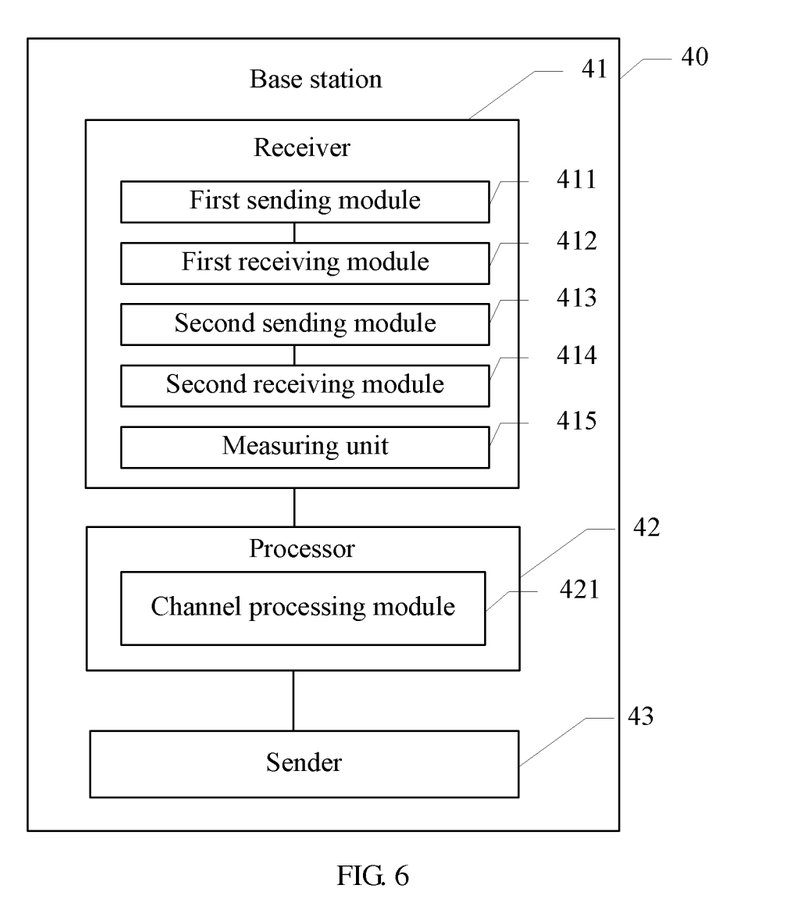
FIG. 6 is a third schematic structural diagram of a base station according to an embodiment of the present invention.

Further, referring to FIG. 6, the processor 42 further includes:

a channel processing module 421, configured to perform zero forcing processing, block diagonalization processing, or maximum signal to leakage and noise ratio processing on channels of the first user and the second user to obtain transmit power and a precoding matrix that are corresponding to the second user.

A subject of the embodiment may be a base station or a base station group, and may also be a node or a node group, or a cell or a cell group. When the subject of the embodiment is a base station, adopted scheduling may be MU-MIMO scheduling for a single cell or a single base station; and when the subject of the embodiment is a base station group, the adopted scheduling may be JP-MU-MIMO scheduling for multiple cells or multiple base stations. No matter what subject of interference coordination is, the method in the present invention can be used to perform interference coordination on the first user, which is not limited herein.

Figure 7:
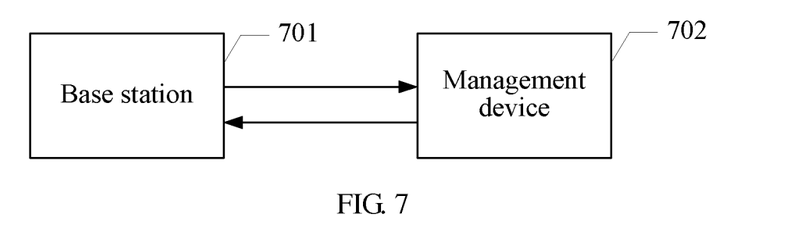
FIG. 7 is a schematic construction diagram of a communication system according to an embodiment of the present invention.

An embodiment of the present invention provides a communication system, which, as shown in FIG. 7, includes:

a base station 701, configured to acquire first user channel state information on a first time-frequency resource on which interference coordination is to be performed and second user channel state information on the first time-frequency resource, transmit data to a second user on the first time-frequency resource according to transmit power and a precoding matrix that are corresponding to the second user and are obtained by a management device 702, but configured not to transmit data to a first user on the first time-frequency resource; and the management device 702, configured to pair the first user and the second user according to the first user channel state information and the second user channel state information to obtain the transmit power and the precoding matrix that are corresponding to the second user.

With the communication system provided in the embodiment of the present invention, the base station acquires first user channel state information on a first time-frequency resource on which interference coordination is to be performed and second user channel state information on the first time-frequency resource; the management device pairs a first user and a second user according to the first user channel state information and the second user channel state information to obtain transmit power and a precoding matrix that are corresponding to the second user; and the base station transmits data to the second user on the first time-frequency resource according to the transmit power and the precoding matrix, but does not transmit data to the first user on the first time-frequency resource. Therefore, interference with the first user can be reduced.

Further, the first user includes a user terminal or a second base station or a virtual user; the second user is a user terminal served by a base station or a user terminal served by a base station group; and a quantity of the first user is one or multiple, and a quantity of the second user is one or multiple.

Further, the base station 701 is further configured to acquire a predefined first time-frequency resource; or, obtain a first time-frequency resource after negotiation with each base station; or, obtain a first time-frequency resource through dynamic determination of a processor of the base station 701.

Further, the base station 701 is further configured to send a channel state request message to the first user, and receive first user channel state information which is measured and generated by the first user, is fed back by the first user, and is on the first time-frequency resource on which interference coordination is to be performed; or, send a channel state request message to another base station, and receive first user channel state information which is measured and generated by the first user, is forwarded by the another base station, and is on the first time-frequency resource on which interference coordination is to be performed; or, measure uplink channel information of the first user, and obtain downlink channel state information of the first user according to the uplink channel information.

Further, the management device 702 is configured to perform zero forcing processing, block diagonalization processing, or maximum signal to leakage and noise ratio processing on channels of the first user and the second user according to the first user channel state information and the second user channel state information to obtain transmit power and a precoding matrix that are corresponding to the second user.

A subject of the embodiment may be a base station or a base station group, and may also be a node or a node group, or a cell or a cell group. When the subject of the embodiment is a base station, adopted scheduling may be MU-MIMO scheduling for a single cell or a single base station; and when the subject of the embodiment is a base station group, the adopted scheduling may be JP-MU-MIMO scheduling for multiple cells or multiple base stations. No matter what subject of interference coordination is, the method in the present invention can be used to perform interference coordination on the first user, which is not limited herein.

In the several embodiments provided in the present application, it should be understood that the apparatus, method, and system provided in the present application may be implemented in other ways. For example, the described apparatus embodiments are only exemplary. For example, the units are only divided according to logical functions and may be divided in other ways in actual implementation. For example, multiple units or modules may be combined or integrated into another system, or some features may be ignored or not performed.

Persons of ordinary skill in the art should understand that all or a part of the steps of the method embodiments may be implemented by a program instructing relevant hardware. The program may be stored in a computer readable storage medium. When the program is run, the steps of the method embodiments are performed. The storage medium may be any medium that is capable of storing program codes, such as a ROM, a RAM, a magnetic disk, or an optical disk.

The foregoing descriptions are only exemplary embodiments of the present invention, but are not intended to limit the protection scope of the present invention. Variations or replacements that can be easily thought of by persons skilled in the art within the technical scope disclosed in the present invention shall all fall within the protection scope of the present invention. Therefore, the protection scope of the present invention shall be subject to that of the claims.

What is claimed is:

1. An interference coordination method, comprising:
   acquiring first user channel state information on a first time-frequency resource on which interference coordination is to be performed;
   acquiring second user channel state information on the first time-frequency resource;
   pairing a first user and a second user according to the first user channel state information, the second user channel state information, and allowing the pairing based on a transmit power and a precoding matrix before and after the pairing; and
   after the pairing is allowed, transmitting data to the second user on the first time-frequency resource according to the transmit power and the precoding matrix after the pairing, but not transmitting data to the first user on the first time-frequency resource.

2. The method according to claim 1, wherein
   the first user is a user terminal or a base station or a node or a virtual user;
   the second user is a user terminal served by a base station or a user terminal served by a base station group; and
   a quantity of the first user is one or multiple, and a quantity of the second user is one or multiple.

3. The method according to claim 1, wherein an acquiring manner of the first time-frequency resource comprises:
   acquiring a predefined first time-frequency resource; or, obtaining a first time-frequency resource after negotiation with each base station; or, obtaining a first time-frequency resource through dynamic determination of a processor thereof.

4. The method according to claim 1, wherein the acquiring first user channel state information on a first time-frequency resource on which interference coordination is to be performed comprises:
   sending a channel state request message to the first user, and receiving first user channel state information which is measured and generated by the first user, is fed back by the first user, and is on the first time-frequency resource on which interference coordination is to be performed;
   or, sending a channel state request message to another base station, and receiving first user channel state information which is measured and generated by the first user, is forwarded by the another base station, and is on the first time-frequency resource on which interference coordination is to be performed;
   or, measuring uplink channel information of the first user, and obtaining downlink channel state information of the first user according to the uplink channel information.

5. The method according to claim 4, wherein the first user channel state information comprises a channel matrix formed by a channel coefficient or a character vector of a channel.

6. The method according to claim 5, wherein the first user channel state information further comprises a signal to interference plus noise ratio of the channel.

7. The method according to claim 6, wherein the first user channel state information is first user channel state information corresponding to the first time-frequency resource;
   or, the first user channel state information is first user channel state information on which statistics is made in a time domain, a frequency domain, or a time-frequency domain.

8. The method according to claim 1, wherein the pairing a first user and a second user comprises:
   performing zero forcing processing, block diagonalization processing, or maximum signal to leakage and noise ratio processing on channels of the first user and the second user.

9. The method according to claim 1, wherein the transmit power is a part or all of available maximum transmit power of the base station on the first time-frequency resource.

10. A base station, comprising:
    a receiver, configured to acquire first user channel state information on a first time-frequency resource on which interference coordination is to be performed, and acquire second user channel state information on the first time-frequency resource;
    a processor, configured to pair a first user and a second user according to the first user channel state information, the second user channel state information, and allow the pair based on a transmit power and a precoding matrix before and after the first user and second user are paired; and
    a sender, configured to, after the pair is allowed, transmit data to the second user on the first time-frequency resource according to the transmit power and the precoding matrix after the first user and the second user are paired, but configured not to transmit data to the first user on the first time-frequency resource.

11. The base station according to claim 10, wherein the processor is further configured to perform dynamic determination to obtain the first time-frequency resource.

12. The base station according to claim 10, wherein the receiver comprises:
    a first sending module, configured to send a channel state request message to the first user;
    a first receiving module, configured to receive first user channel state information which is measured and generated by the first user, is fed back by the first user, and is on the first time-frequency resource on which interference coordination is to be performed;

and/or, a second sending module, configured to send a channel state request message to another base station;

a second receiving module, configured to receive first user channel state information which is measured and generated by the first user, is forwarded by the another base station, and is on the first time-frequency resource on which interference coordination is to be performed;

and/or, a measuring unit, configured to measure uplink channel information of the first user, and obtain downlink channel state information of the first user according to the uplink channel information.

13. The base station according to claim 10, wherein the processor comprises:

a channel processing module, configured to perform zero forcing processing, block diagonalization processing, or maximum signal to leakage and noise ratio processing on channels of the first user and the second user.

14. A communication system, comprising:

a base station, configured to acquire first user channel state information on a first time-frequency resource on which interference coordination is to be performed and second user channel state information on the first time-frequency resource, transmit data to a second user on the first time-frequency resource according to transmit power and a precoding matrix that are corresponding to the second user after the first user and the second user are paired, but configured not to transmit data to a first user on the first time-frequency resource; and a management device, configured to pair the first user and the second user according to the first user channel state information, the second user channel state information, and allow the pair based on the transmit power and the precoding matrix before and after the first user and the second user are paired.

15. The communication system according to claim 14, wherein the first user comprises a user terminal or a second base station or a virtual user;

the second user is a user terminal served by a base station or a user terminal served by a base station group; and a quantity of the first user is one or multiple, and a quantity of the second user is one or multiple.

16. The communication system according to claim 14, wherein the base station is further configured to acquire a predefined first time-frequency resource; or, obtain a first time-frequency resource after negotiation with each base station; or, obtain a first time-frequency resource through dynamic determination of a processor of the base station.

17. The communication system according to claim 14, wherein the base station is further configured to send a channel state request message to the first user, and receive first user channel state information which is measured and generated by the first user, is fed back by the first user, and is on the first time-frequency resource on which interference coordination is to be performed;

or, send a channel state request message to another base station, and receive first user channel state information which is measured and generated by the first user, is forwarded by the another base station, and is on the first time-frequency resource on which interference coordination is to be performed;

or, measure uplink channel information of the first user, and obtain downlink channel state information of the first user according to the uplink channel information.

18. The communication system according to claim 14, wherein the management device is configured to perform zero forcing processing, block diagonalization processing, or maximum signal to leakage and noise ratio processing on channels of the first user and the second user according to the first user channel state information and the second user channel state information.

19. The communication system according to claim 14, wherein the base station comprising:

a receiver, configured to acquire the first user channel state information on the first time-frequency resource on which interference coordination is to be performed, and acquire the second user channel state information on the first time-frequency resource;

a processor, configured to pair the first user and the second user according to the first user channel state information and the second user channel state information to obtain the transmit power and the precoding matrix that are corresponding to the second user; and a sender, configured to transmit data to the second user on the first time-frequency resource according to the transmit power and the precoding matrix, but configured not to transmit data to the first user on the first time-frequency resource.

* * * * *